(12) United States Patent
Birli et al.

(10) Patent No.: US 7,221,966 B2
(45) Date of Patent: May 22, 2007

(54) WIRELESS COMMUNICATION SYSTEMS FOR MASKS OR HELMETS

(75) Inventors: Joseph Birli, Munson, OH (US); Greg Skillicorn, Grainger Township, OH (US); Gary Claypoole, West Chester, OH (US)

(73) Assignee: Ultra Electronics Audio Pack, Inc., Garfield Heights, OH (US)

( * ) Notice: Subject to any disclaimer, the term of this patent is extended or adjusted under 35 U.S.C. 154(b) by 389 days.

(21) Appl. No.: 10/700,744

(22) Filed: Nov. 4, 2003

(65) Prior Publication Data

US 2005/0096096 A1  May 5, 2005

(51) Int. Cl.
*H04M 1/00* (2006.01)
*H04B 7/00* (2006.01)

(52) U.S. Cl. .............................. 455/569.1; 455/575.2; 455/41.2

(58) Field of Classification Search ............. 455/569.1, 455/575.2, 90.3, 90.1, 90.2, 41.2, 556.1, 455/550.1, 100, 350; 340/573.1, 521, 522
See application file for complete search history.

(56) References Cited

U.S. PATENT DOCUMENTS

| | | | | |
|---|---|---|---|---|
| 3,889,190 A | * | 6/1975 | Palmer | ..................... 455/90.3 |
| 4,259,747 A | * | 4/1981 | Taesler et al. | ................. 2/422 |
| 4,491,699 A | | 1/1985 | Walker | |
| 5,428,688 A | | 6/1995 | Becker et al. | |
| 5,566,362 A | | 10/1996 | Bauer et al. | |
| 5,615,410 A | | 3/1997 | DeMars | |
| 5,692,059 A | | 11/1997 | Kruger | |
| 5,889,730 A | * | 3/1999 | May | ........................... 367/132 |
| 5,926,532 A | | 7/1999 | Peck | |
| 6,009,563 A | * | 1/2000 | Swanson et al. | ............... 2/425 |
| 6,101,256 A | | 8/2000 | Steelman | |
| 6,121,881 A | * | 9/2000 | Bieback et al. | .......... 340/573.1 |
| 6,876,845 B1 | * | 4/2005 | Tabata et al. | ............... 455/344 |
| D505,969 S | * | 6/2005 | Yeung | ........................ D16/309 |
| 6,930,608 B2 | * | 8/2005 | Grajales et al. | .......... 340/573.5 |
| 2002/0197961 A1 | | 12/2002 | Warren | |
| 2003/0036360 A1 | | 2/2003 | Russell et al. | |
| 2003/0053619 A1 | | 3/2003 | Wu | |
| 2003/0058100 A1 | | 3/2003 | Jumpertz | |
| 2003/0083112 A1 | | 5/2003 | Fukuda | |
| 2005/0201548 A1 | * | 9/2005 | Birli et al. | ............. 379/387.01 |

FOREIGN PATENT DOCUMENTS

| | | |
|---|---|---|
| EP | 0465971 A2 | 1/1992 |
| EP | 0 531 645 A2 | 3/1993 |
| FR | 79 09231 | 4/1979 |
| GB | 2 103 043 A | 2/1983 |
| WO | WO 95/18490- | 7/1995 |
| WO | WO 02/062096 A2 | 8/2002 |
| WO | PCT/US2004/036652 | 4/2004 |

* cited by examiner

*Primary Examiner*—Sonny Trinh
(74) *Attorney, Agent, or Firm*—Fay, Sharpe LLP; Brian E. Turung

(57) ABSTRACT

Various types of wireless communication systems for masks or helmets can be mounted externally or internally on a mask. Different types of microphones can be employed, for example, a bone-conducting microphone or a directional microphone. Ear speakers mounted at various locations on the mask or helmet can be employed. Wireless communication is with a transceiver mounted in or on a lapel unit, a walkie-talkie, or at a remote location.

52 Claims, 5 Drawing Sheets

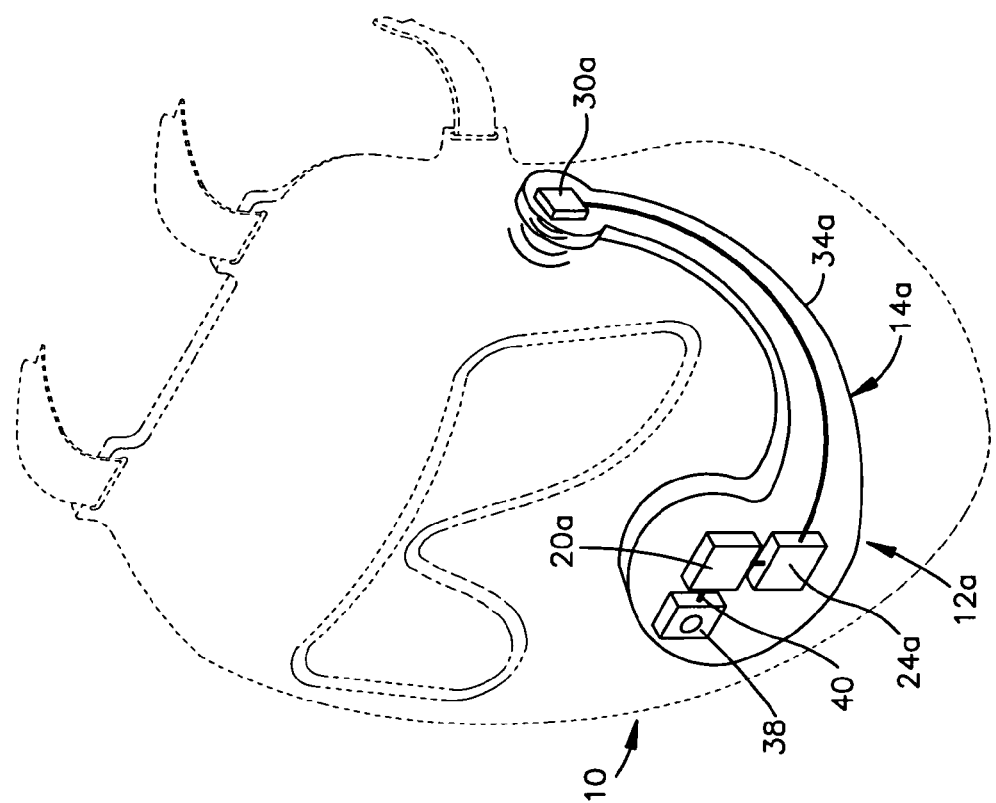
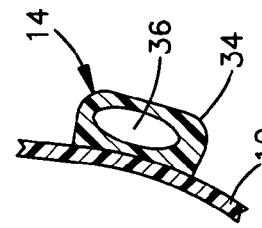
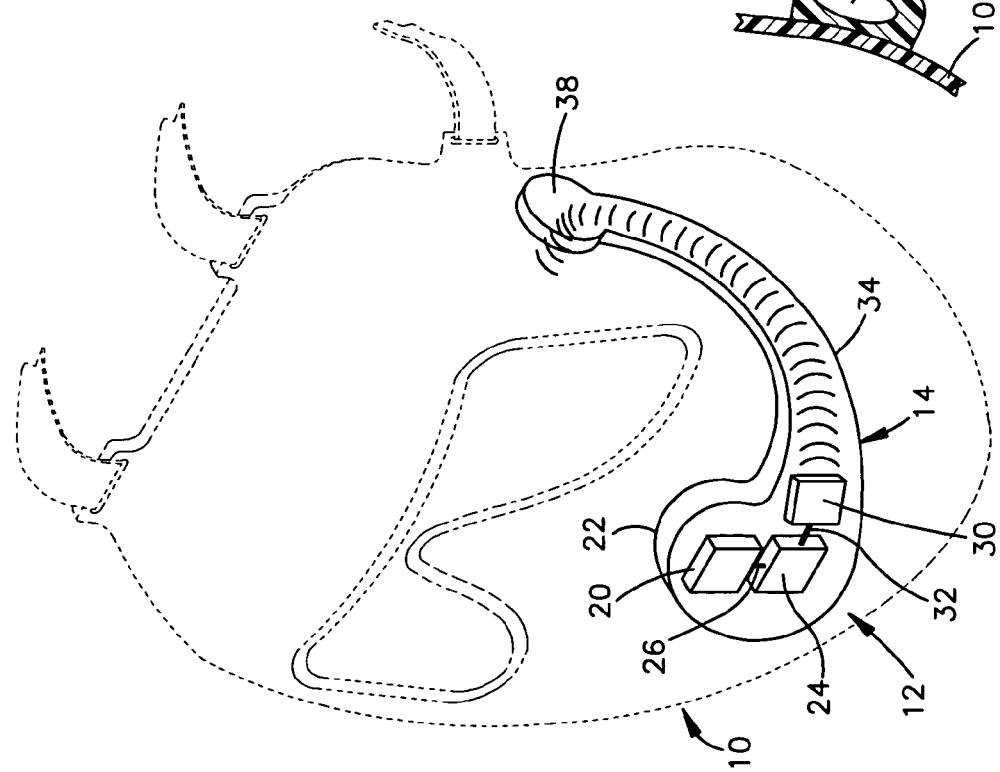

WIRELESS COMMUNICATION SYSTEMS FOR MASKS OR HELMETS

TECHNICAL FIELD

The present invention relates to wireless communication technologies and systems. In particular, the present invention relates to wireless communication systems usable in connection with a mask or helmet of the type worn by safety personnel, for example.

BACKGROUND OF THE INVENTION

Masks or helmets of various types are worn by people for different reasons. For example, some occupations require the wearing of a mask or helmet at least part of the time. Safety personnel, for example, firefighters, may wear a mask to enable breathing of fresh air or gases such as oxygen. It may be important for such personnel to communicate orally with others nearby or at remote locations. Therefore, some masks include a communication system, such as a voice amplification system or a radio interface system. Some of these systems use microphones and amplifiers to help the user to be heard clearly outside the user's mask, either directly at the location or remotely via a radio frequency connection.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic illustration of an external assembly for use with a mask and including a wireless microphone and an ear speaker;

FIG. 2 is a sectional view through a portion of the assembly of FIG. 1;

FIG. 3 is a view similar to FIG. 1 is an external assembly including a wireless microphone, an ear speaker, and a voice amplifier;

DETAILED DESCRIPTION OF THE INVENTION

Figure 5:
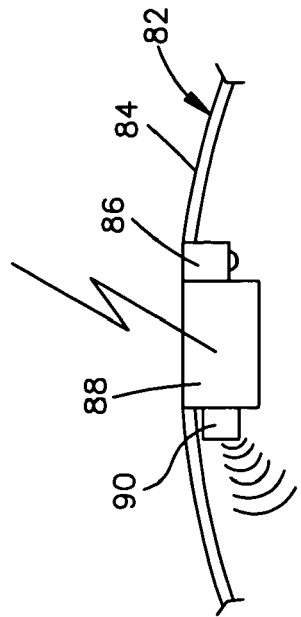
FIG. 5 is a schematic illustration of a wireless communication system in accordance with another embodiment of the invention including a bone conducting microphone and an ear speaker.

FIG. 1 illustrates a mask 10 with an external microphone and speaker assembly 12. The assembly 12 may be mounted on the mask 10 in any suitable manner. For example, the external assembly 12 may be mounted on a voice emitter portion of a mask 10, or on a filter or oxygen inlet portion of the mask. The location and orientation of the assembly 12 on the mask 10 in FIG. 1 is shown only schematically. (It should be understood that when "mask" or "helmet" is used herein, application of the invention to the other type of device may also be possible—thus, when reference is made to a mask, it may apply also to a helmet, and vice versa.) An adapter kit may be used to mount any system to any mask.

The assembly 12 includes a housing shown schematically at 14. The housing 14 is preferably molded as one or more pieces from a suitable plastic material. The configuration of the housing 14 is adapted to mount on the mask 10, to enclose and support the other components of the assembly 12, and to direct sound, as described below, toward the ear of the wearer of the mask.

The assembly 12 includes a microphone shown schematically at 20. The microphone 20 may be of any type suitable for use in this application. The microphone 20 is enclosed and supported in a main body portion 22 of the housing 14. The microphone 20 is located and oriented so as to pick up the voice of the wearer of the mask 10. Thus, the housing 14 may include one or more openings for enabling the sound from the user's voice to enter the housing and be picked up by the microphone 20.

The assembly 12 also includes a transceiver shown schematically at 24. The transceiver 24 may be any suitable small transceiver, including or associated with a battery for electrical power, for transmitting the output signal from the microphone 20 to a remote (off the mask) location. The transceiver 24 is preferably located adjacent to the microphone 20 in the main body portion 22 of the housing 14. The transceiver 24 is electrically connected with the microphone 20 by wiring or in another manner as shown schematically at 26. (The microphone 20 and transceiver 24 may be formed as one integrated electronic unit.) As a result, the output signal of the microphone 20 is directed to the transceiver 24 for wireless transmission to a remote location. The remote location may be a receiver on the wearer's body, such as on a lapel unit or on a waist-mounted walkie-talkie. Alternatively, the remote location may be a location off the wearer's body, such as a central location or another person.

The assembly 12 also includes an ear speaker shown schematically at 30. The ear speaker 30 may be of any type suitable for use in this application. The ear speaker 30 is enclosed and supported in the main body portion 22 of the housing 14. The ear speaker 30 is located adjacent to the transceiver 24 and is electrically connected with the transceiver by wiring or in another manner as shown schematically at 32. (The ear speaker 30, microphone 20, and transceiver 24 may be formed as one integrated electronic unit.) As a result, the ear speaker 30 is adapted to receive electrical signals from the transceiver 24 and convert them into sound audible to the wearer of the mask 10. The transceiver 24 can receive wireless signals from a remote location and direct them to the ear speaker 30 so that the wearer of the mask 10 can hear something that is being said remotely from the wearer.

The audible output of the ear speaker 30 is directed into an extension portion 34 of the housing 14. The extension portion 34 of the housing 14 has a three dimensionally curved configuration that extends rearward and/or upward along the mask 10, in a direction toward the wearer's ear, from the main body portion 22. The extension portion 34 of the housing may have a width in the range of from about one half inch to about two inches.

As shown in FIG. 2, the extension portion 34 of the housing 14 has an enclosed air passage or channel 36 for enabling air and sound to travel between the ear speaker 30 and an extended end portion 38 of the housing 14. When the sound reaches the housing end portion 38, the sound is directed toward the wearer's ear, for example, laterally inward as shown in FIG. 1. In this way, the ear speaker 30 can be located near the transceiver 24 and other electrical components of the assembly 12, while the sound is transmitted essentially undisturbed to a location close to the wearer's ear.

Because the assembly 12 is externally mounted, it is suitable for use with different types of masks 10. Because it is self-contained, including microphone 20, speaker 30, and transceiver 24, the assembly 12 is suitable for providing a mask 10 or a mask wearer with wireless communication in a quick and easy manner. The provision of the extension portion 34 of the housing 14 enables the wearer to hear even in noisy circumstances or with a low powered ear speaker 30.

FIG. 3 illustrates an external assembly 12a similar to the assembly 12 of FIG. 1 but further including a voice amplifier shown schematically at 40. The voice amplifier 40 is electrically connected with the transceiver 24a by wiring or in another manner as shown schematically at 42. The transceiver 24a receives the output of the microphone 20a and transmits a suitable signal, over the wiring 42, to the voice amplifier 40. The voice amplifier 40 converts the signal to sound audible in the immediate area surrounding the wearer. Thus, the mask wearer's voice is made audible near the wearer by the voice amplifier 40, as well as remotely via the wireless transceiver 24, all with one self-contained, externally mounted assembly 12a.

In addition, FIG. 3 illustrates an alternative placement of the ear speaker. Specifically, the external assembly 12a includes an ear speaker 30a that is mounted at the distal end portion 38a of the tubular extension portion 34a of the housing 14a. In this manner, the ear speaker 30a is located closer to the wearer's ear. The ear speaker 30a may be connected by wiring to the transceiver 24a. The wiring may run through a channel in the extension portion 34a of the housing 14a, or may be embedded in an extension portion that is solid, i.e., not having any channel.

Figure 4:
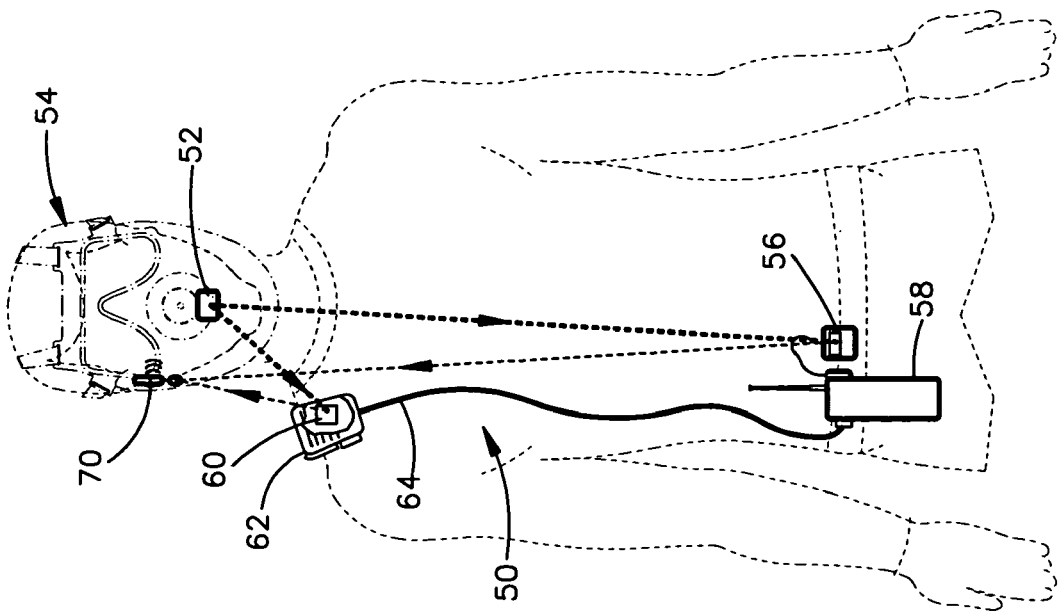
FIG. 4 is a schematic illustration showing a wireless communication system in accordance with another embodiment of the invention including a wireless microphone and a wireless ear speaker.

FIG. 4 illustrates a communication system 50 including a wireless microphone assembly 52 mounted on a mask or helmet shown schematically at 54. The microphone assembly 52 includes a transmitter that transmits a signal to a transceiver 56 connected with a walkie-talkie 58 mounted on the waist of the wearer. The transceiver 56 is adapted to receive signals from the wireless microphone 52 for communication via the walkie-talkie 58 with remote locations. (By "walkie-talkie" is meant a battery powered unit with speaker and microphone that is powerful enough to transmit to a remote location, including the typical hand-held unit but also including other types of units.)

Alternatively, the microphone 52 can transmit to a transceiver 60 that is embedded in a shoulder unit or lapel unit 62. The lapel unit 62 is connected by wires 64 to the walkie-talkie 58. The lapel unit 62, which clips on the lapel or shoulder of the wearer, serves as an external microphone and speaker for the walkie-talkie 58, in a known manner. In accordance with the invention, the transceiver 60 that is embedded in the lapel unit 62 is adapted to receive signals from the wireless microphone 52 for communication via the walkie-talkie 58 with remote locations. Wired connection between the transceiver 60 and the walkie-talkie 58 can be established over the existing wires 64 between the lapel unit 62 and the walkie-talkie, or can be established over additional wires between the lapel unit and the walkie-talkie.

The communication system also includes a wireless ear speaker, shown schematically at 70, on the mask or helmet 54. The ear speaker 70 includes a receiver that receives a signal from the transceiver 56 that is connected with the walkie-talkie 58 mounted on the waist of the wearer. The transceiver 56 is adapted to transmit signals to the wireless ear speaker 70 for communication via the walkie-talkie 58 from remote locations.

Alternatively, the ear speaker 70 can receive transmissions from the transceiver 60 that is embedded in the lapel unit 62. The transceiver 60 is adapted to send signals to the wireless ear speaker for communication via the walkie-talkie 58 from remote locations.

FIG. 5 illustrates a communication system 80 for use with a helmet 82. The helmet 82 includes a strap, a portion of which is shown at 84. The strap 84 overlies the wearer's head when the helmet 82 is being worn.

Mounted on the strap 84 is a bone-conducting microphone or accelerometer 86 of a known type. The output of the bone-conducting microphone or accelerometer 86 is electrically connected with a transceiver 88 mounted on the strap 84 adjacent to the microphone.

Also mounted on the strap 84, adjacent the microphone 86 and the transceiver 88, is an ear speaker 90. The ear speaker 90 has an audio output that is pointed toward the ear of the wearer of the helmet 82.

Signals to and from the transceiver 88 are sent wirelessly to a remote location—either elsewhere on the wearer's body, or at another location. The microphone 86, transceiver 88, and ear speaker 90 may form a single, integrated electronic assembly that is attached to the strap 84. In this way, a complete communication system 80 is provided that can be attached as one unit, wirelessly, to an existing helmet 82.

Figure 5A:
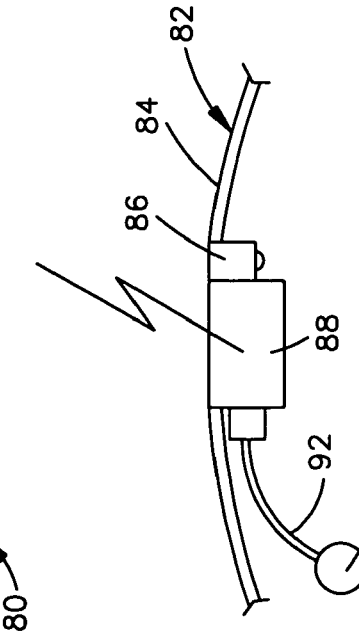
FIGS. 5A and 6 are schematic illustrations of other wireless communication systems including bone conducting microphones.

FIG. 5A illustrates a communication system 80a similar to the system shown in FIG. 5. In the system of FIG. 5A, however, the ear speaker 90 is mounted on a boom 92 extending from the transceiver 88. This places the ear speaker 90 closer to the ear of the wearer.

As is the case with the system of FIG. 5, signals to and from the transceiver 88 of the system of FIG. 5A are sent wirelessly to a remote location—either elsewhere on the wearer's body, or at another location. The microphone 86, transceiver 88, boom 92, and ear speaker 90 may form a single, integrated electronic assembly that is attached to the strap 84. In this way, a complete communication system 80a is provided that can be attached as one unit, wirelessly, to an existing helmet 82.

Figure 6:
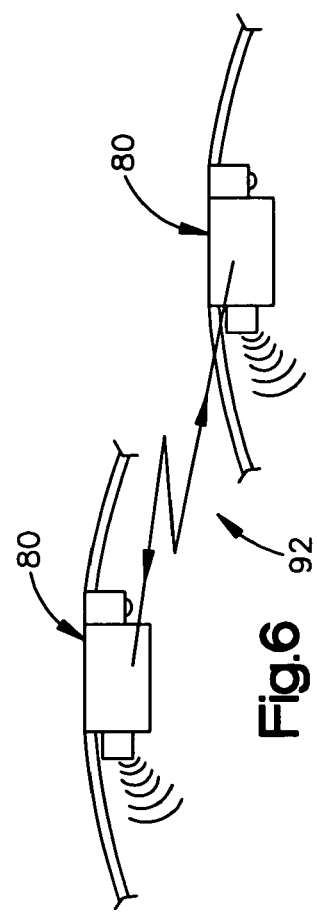

FIG. 6 illustrates a communication system 92 that includes two of the systems 80 that are shown in FIG. 5. In the system of FIG. 6, however, each one of the systems 80 communicates with the other system 80. In this way, team-based communication is established in a manner so that team members are able to communicate directly with each other rather than having to communicate through a central location.

Of course, each of the systems 80 can be configured so that it communicates with a central location, at the same time as it communicates with the other team members.

Figure 7:
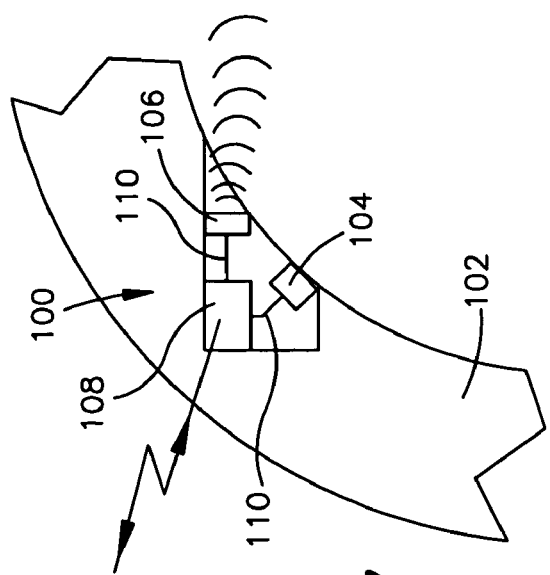
FIG. 7 is a schematic illustration of a wireless communication system embedded in a helmet or mask and including a microphone and an ear speaker.

FIG. 7 illustrates a communication system 100 that is formed as a single unit or assembly. The system 100 is embedded in or otherwise mounted in a helmet, a portion of which is shown schematically at 102. The system 100 includes an ear speaker 104, a directional microphone 106, and a transceiver 108. The directional microphone 106 is oriented relative to the helmet 102 so that it is pointed toward the user's mouth. The ear speaker 104 is oriented relative to the helmet 102 so that it is pointed toward the user's ear. The microphone 106 and ear speaker 104 are each connected with the transceiver 108 by wiring or in another manner as shown schematically at 110. Alternatively, the microphone 106 and ear speaker 104 and transceiver 108 may be formed as one integrated assembly, for example on one chip or circuit board, eliminating the need for external electrical connections. The assembly 100 may be very small, for example, coin-sized, to reduce weight and to enable desired placement in the mask or helmet 102. In this way, a single communication system 100 is provided which can be mounted directly in an existing helmet 102, and provide wireless communication for the wearer.

Figure 8:
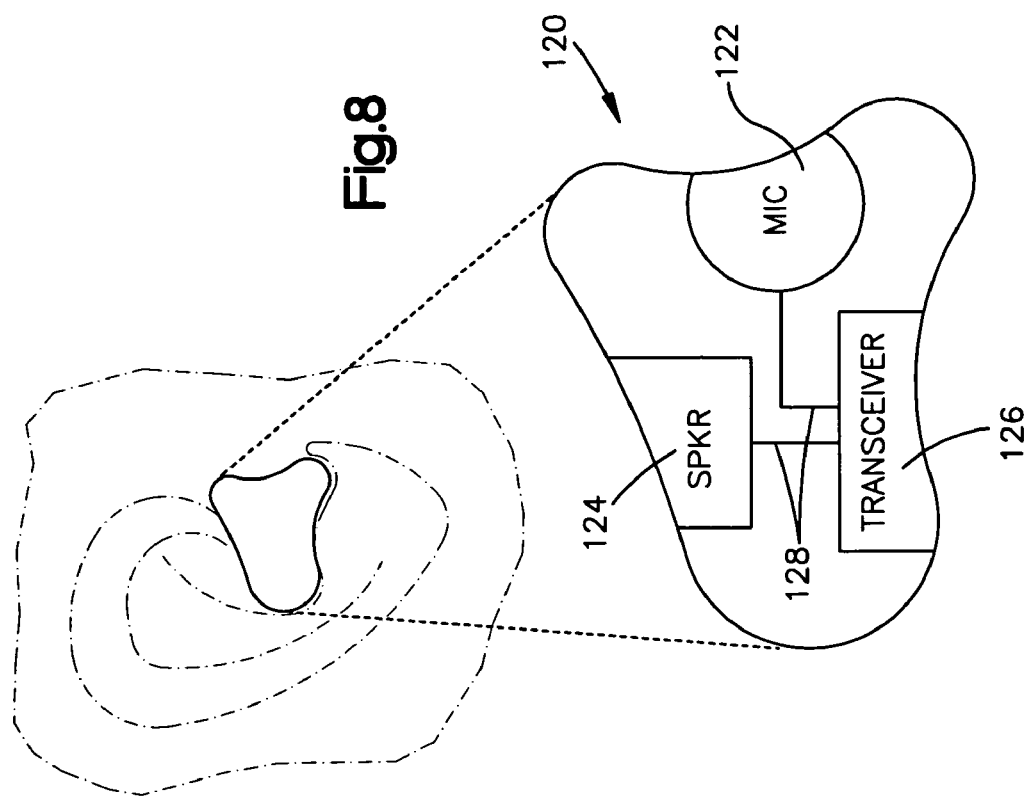
FIGS. 8 and 8A are schematic illustrations of wireless communication systems supported in or on the ear of a wearer.

FIG. 8 illustrates schematically a communication system 120 that is formed as a single unit or assembly for use in a wearer's ear. The system 120 includes a microphone 122, an ear speaker 124, and a transceiver 126. The microphone 122 and the ear speaker 124 are each connected with the transceiver 126 by wiring or in another manner as shown schematically at 128. Alternatively, the microphone 122 and ear speaker 124 and transceiver 126 may be formed as one integrated electronic assembly, for example on one circuit board, eliminating the need for separate electrical connections. The microphone 122 may be a bone-conducting microphone that picks up sound via vibrations of the head or ear bones. In this way, a single communication system 120 is provided which can be placed directly in the ear of a wearer, and provide wireless communication for the wearer.

Figure 8A:
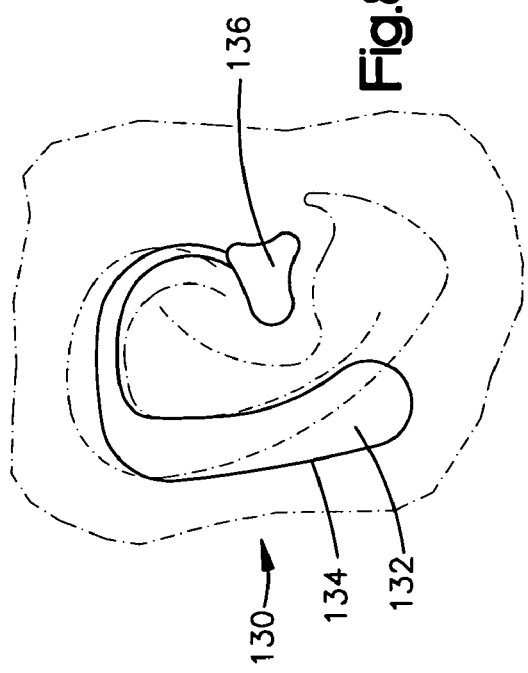

FIG. 8A illustrates schematically a communication system 130 that is similar to the system 120 of FIG. 8 but in which the transceiver 132 is located in a behind-the-ear unit 134. The behind-the-ear unit 134 is connected electrically with the in-the-ear unit 136 which contains only the microphone and the ear speaker. As a result of the offloading of the transceiver 132 from the in-the-ear unit 136, the in-the-ear unit can be made smaller and lighter. Alternatively, the electronic components of the assembly may all be mounted in the ear as shown in FIG. 8, with a behind the ear structure as shown in FIG. 8A for support only.

Figure 9:
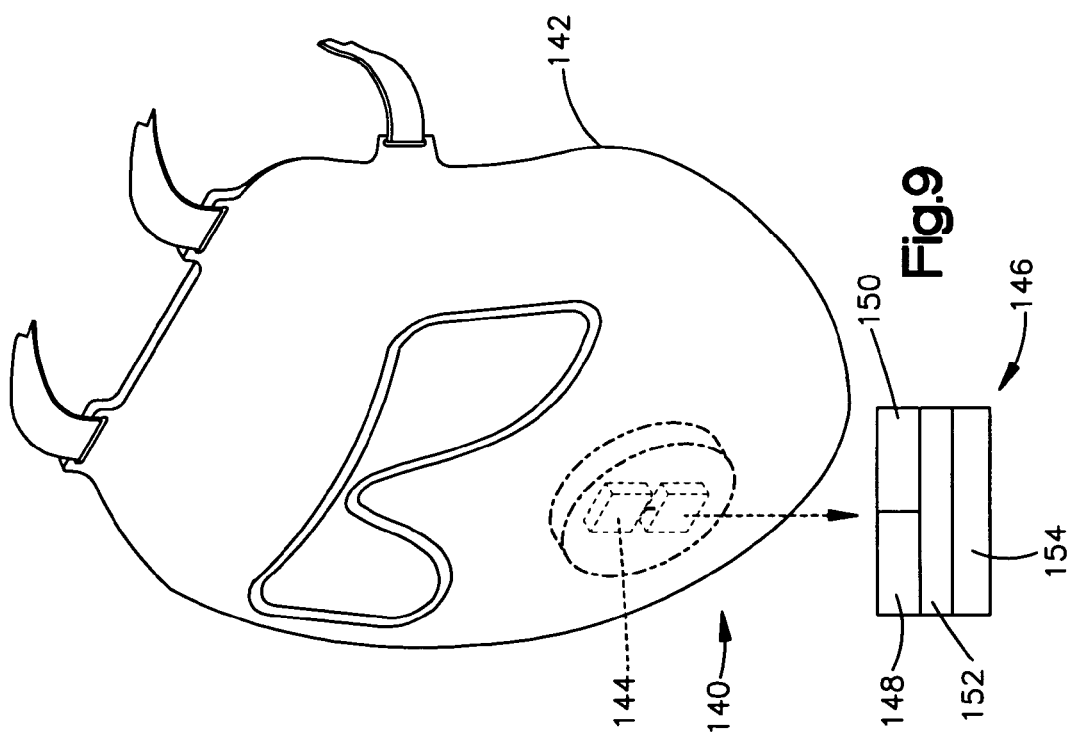
FIG. 9 is a schematic illustration of a wireless communication system including a wireless microphone inside a mask.

FIG. 9 illustrates schematically a communication system 140 that is internal to a mask 142. The system 140 includes a wireless microphone 144 located inside the mask 142. The microphone transmits to a voice amplifier assembly (shown schematically at 146) that is mounted on the wearer's body. The voice amplifier assembly 146 includes has a receiver 148, a power supply 150, an amplifier 152, and a speaker 154.

As a result, a voice amplifier system 146 is provided that requires the mask 142 to support only a wireless microphone. This minimizes the number and size of the components that are mounted on the mask 142, while still allowing the wearer's voice to be projected locally.

Figure 10:
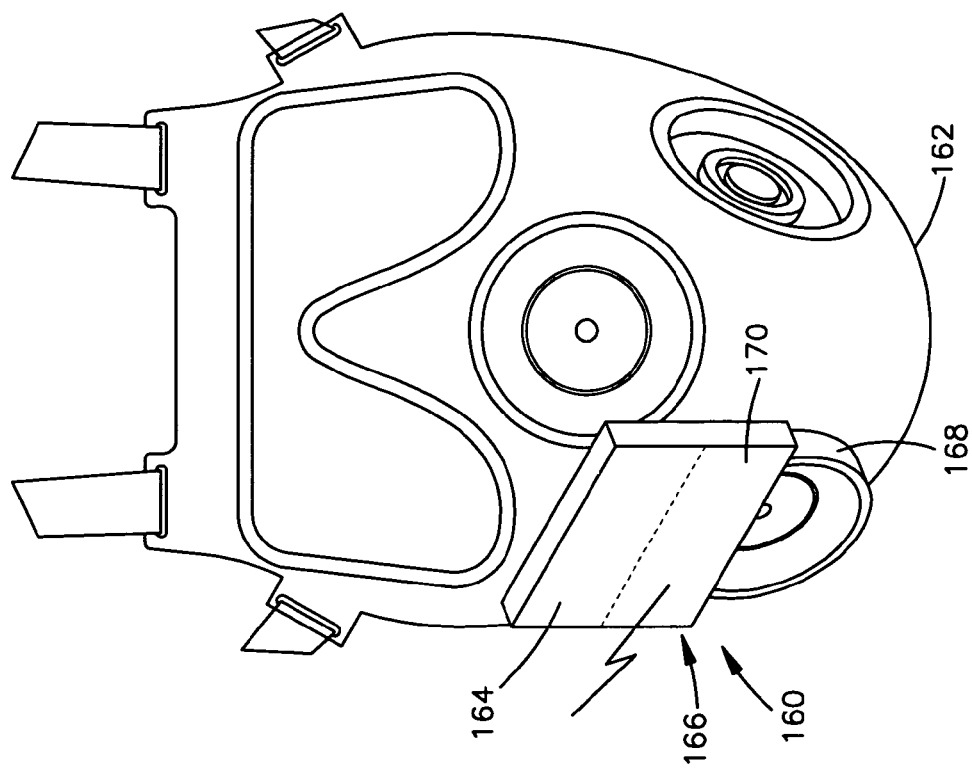
FIG. 10 is a schematic illustration of a wireless communication system including a heads up display mounted externally on a mask.

FIG. 10 illustrates schematically a communication system 160 that is external to a mask 162. The system 160 includes a wireless heads up display 164 located external to the mask 162. In the illustrated embodiment, the heads up display 164 is part of a unit 166 that is supported on a voice emitter mounting bracket 168. The unit 166 also includes a receiver 170 for receiving data for the display 164. The receiver 170 receives data from a transceiver (not shown) located elsewhere on the wearer's body, for example, at waist level. The transceiver receives the data from a remote location and transmits it locally, via the receiver 170, to the display 164 on the mask. This arrangement minimizes the size and weight of the components that are mounted on the mask 162. It should be understood that the display 164 could be mounted elsewhere on the mask 162, or in another manner.

Figure 11:
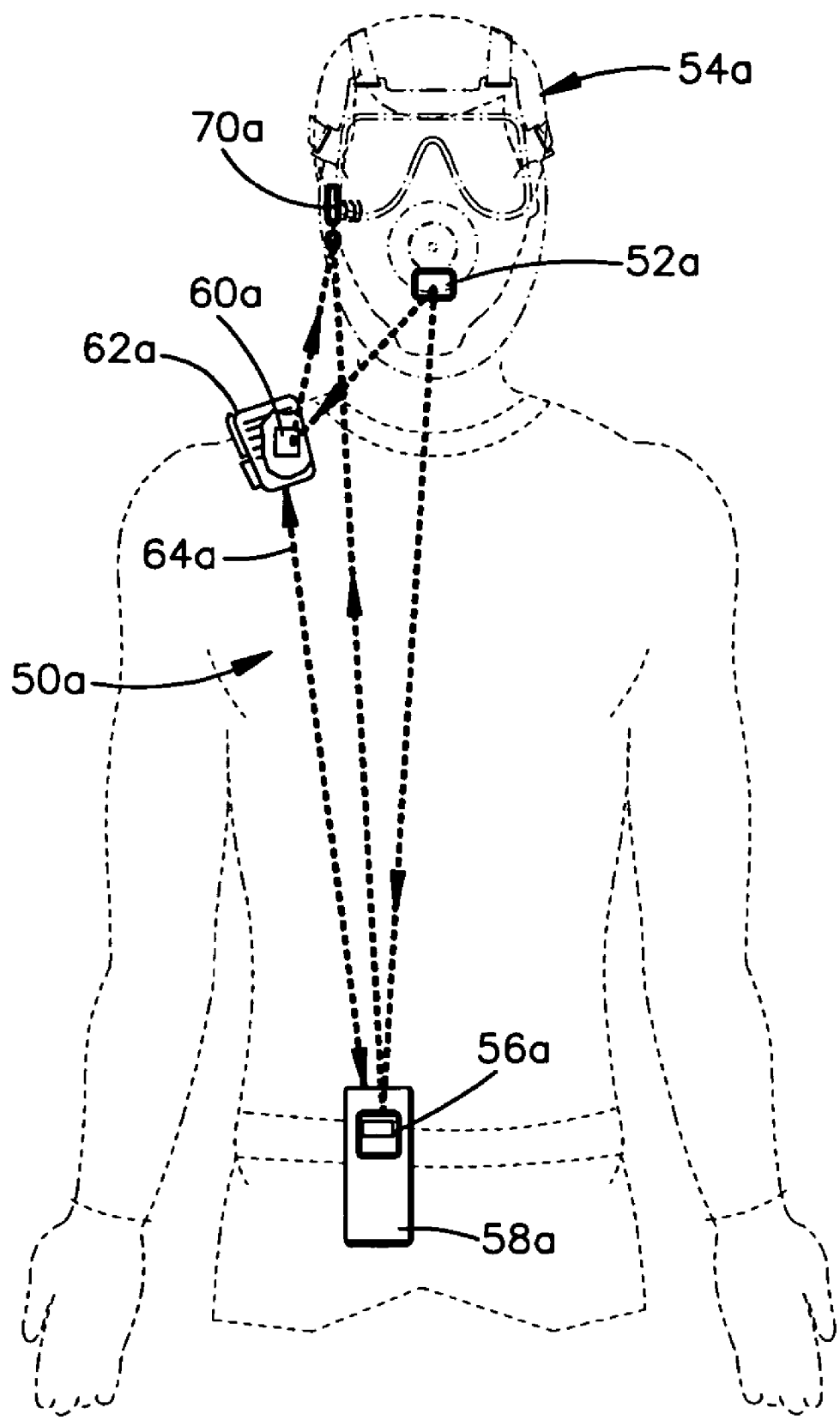
FIG. 11 is a view similar to FIG. 4 of wireless communication system in accordance with a further embodiment of the invention including a wireless microphone and a wireless ear speaker.

FIG. 11 illustrates a communication system 50*a* that is similar to the system 50 shown in FIG. 4. Parts of the system 50*a* that are the same as or similar to corresponding parts of the system 50 are given the same reference numeral with the suffix "a" added for clarity.

In the system 50*a* (FIG. 11), in comparison to the system 50 (FIG. 4), the transceiver 56 is built into the walkie-talkie 58. The transceiver 56 is adapted to receive signals from the wireless microphone 52 for communication via the walkie-talkie 58 with remote locations. The transceiver 56 is also adapted to transmit signals to the wireless ear speaker 70 for communication via the walkie-talkie 58 from remote locations.

Also in the system 50*a* (FIG. 11), in comparison to the system 50 (FIG. 4), the lapel unit 62 communicates wirelessly with the walkie-talkie 58 as indicated by the dashed line 64*a*, rather than with the wired connection shown at 64 in FIG. 4. this modification can be used separately from or in conjunction with the modification noted above of the transceiver being built into the walkie-talkie. Either of these modifications can be used in conjunction with any appropriate one of the other embodiments shown in this application.

It should be understood that various different types of wireless communication are usable with the present invention. Any suitable existing RF communication system is usable, along with other short range wireless protocols, such as (but not limited to) Bluetooth, Zigbee, WiFi (802.11a dn 802.11b), and 802.15.3. The use of the term "radio" or "radio signal" herein is meant to encompass any such type of wireless communication.

From the above description of the invention, those skilled in the art will perceive improvements, changes, and modifications in the invention. Such improvements, changes, and modifications within the skill of the art are intended to be included within the scope of the appended claims.

Having described the invention, we claim:

1. A wireless communication system for use externally on a mask or helmet comprising: a housing for connection with the mask or helmet to support said system on the mask or helmet; a transceiver located at least partially in said housing, said transceiver designed to send signals, receive signals, or combinations thereof; a microphone located at least partially in said housing, said microphone designed to pick up a voice of a wearer of the mask or helmet, the output of said microphone being at least partially directed to said transceiver; an ear speaker at least partially located in said housing, said ear speaker designed to receive signals from said transceiver and to generate audible sound from signals received by said transceiver; and a channel located at least partially in said housing, said channel designed to direct sound from said ear speaker at least partially along a side of the mask or helmet toward an ear of the wearer of the mask or helmet.

2. The system as defined in claim 1, wherein said transceiver and said microphone and said ear speaker are at least partially located in a main body portion of said housing, said microphone located at least closely adjacent to a mouth of the wearer of the mask or helmet, and said channel is formed in a tubular extension of said housing.

3. The system as defined in claim 2, wherein said tubular extension of said housing extends rearwardly and upwardly from said main body portion of said housing.

4. The system as defined in claim 3, wherein said tubular extension of said housing has a three-dimensionally curved configuration as it extends rearwardly and upwardly from said main body portion of said housing.

5. The system as defined in claim 3, wherein said tubular extension of said housing has a width in the range of from about one half inch to about two inches.

6. The system as defined in claim 5, wherein said transceiver is designed to send signals wirelessly to a location remote from the mask or helmet, received signals remote from the mask or helmet, or combinations thereof.

7. The system as defined in claim 6, wherein said signals received by said transceiver, sent by said transceiver, or combinations thereof include radio signals.

8. The system as defined in claim 7, wherein said ear speaker is electrically connected to said transceiver.

9. The system as defined in claim 8, including a voice amplifier connected to said transceiver.

10. The system as defined in claim 2, wherein said tubular extension of said housing has a width in the range of from about one half inch to about two inches.

11. The system as defined in claim 1, wherein said transceiver is designed to send signals wirelessly to a location remote from the mask or helmet, received signals remote from the mask or helmet, or combinations thereof.

12. The system as defined in claim 1, wherein said signals received by said transceiver, sent by said transceiver, or combinations thereof include radio signals.

13. The system as defined in claim 1, wherein said ear speaker is electrically connected to said transceiver.

14. The system as defined in claim 1, including a voice amplifier connected to said transceiver.

15. The system as defined in claim 14, including a second speaker at least partially located in said housing, said voice amplifier including an amplifier that receives an output from said microphone, said second speaker designed to project sound externally of said housing and the mask or helmet, said second speaker spaced from said ear speaker.

16. The system as defined in claim 15, including a second speaker at least partially located in said housing, said voice amplifier including an amplifier that receives an output from said microphone, said second speaker designed to project sound externally of said housing and the mask or helmet, said second speaker spaced from said ear speaker.

17. A communication system for use with a mask or helmet comprising: a housing designed to externally connect to the mask or helmet and to support said system on the mask or helmet; a transceiver located at least partially in said housing, said transceiver designed to send signals, receive signals, or combinations thereof a microphone located at least partially in said housing, said microphone designed to pick up a voice of a wearer of the mask or helmet, the output of said microphone being at least partially directed to said transceiver, said microphone located at least closely adjacent to a mouth of the wearer of the mask or helmet; an ear speaker at least partially located in said housing, said ear speaker designed to receive signals from said transceiver and to generate audible sound from signals received by said transceiver; and an extension member that extends rearwardly and upwardly between said main body portion of said housing and a location at least closely adjacent to an ear of the wearer of the mask or helmet, said ear speaker at least partially located in said extension member such that said ear speaker is at least closely adjacent to an ear of the wearer of the mask or helmet, said ear speaker electrically connected to said transceiver by at least one wire, said extension member including a channel, said channel designed to enable said wire to extend between said ear speaker and said transceiver.

18. The system as defined in claim 17, wherein said transceiver and said microphone are at least partially located in a main body portion of said housing, said microphone located adjacent to a voice emitter portion, oxygen inlet or filter inlet of the mask.

19. The system as defined in claim 18, wherein said transceiver is designed to send signals wirelessly to a location remote from the mask or helmet, received signals remote from the mask or helmet, or combinations thereof.

20. The system as defined in claim 19, wherein said signals received by said transceiver, sent by said transceiver, or combinations thereof include radio signals.

21. The system as defined in claim 20, including a voice amplifier connected to said transceiver.

22. The system as defined in claim 21, including a second speaker at least partially located in said housing, said voice amplifier including an amplifier that receives an output from said microphone, said second speaker designed to project sound externally of said housing and the mask or helmet, said second speaker spaced from said ear speaker.

23. The system as defined in claim 22, wherein said extension member has a width of up to about two inches.

24. The system as defined in claim 17, wherein said transceiver is designed to send signals wirelessly to a location remote from the mask or helmet, received signals remote from the mask or helmet, or combinations thereof.

25. The system as defined in claim 17, wherein said signals received by said transceiver, sent by said transceiver, or combinations thereof include radio signals.

26. The system as defined in claim 17, including a voice amplifier connected to said transceiver.

27. The system as defined in claim 26, including a second speaker at least partially located in said housing, said voice amplifier including an amplifier that receives an output from said microphone, said second speaker designed to project sound externally of said housing and the mask or helmet, said second speaker spaced from said ear speaker.

28. The system as defined in claim 17, wherein said extension member has a width of up to about two inches.

29. A wireless communication system for use with a mask or helmet comprising: a housing designed to externally connect to the mask or helmet and to support said system on the mask or helmet; a housing transceiver located at least partially in said housing, said housing transceiver designed to wirelessly send signals, wirelessly receive signals, or combinations thereof; a microphone located at least partially in said housing, said microphone designed to pick up a voice of a wearer of the mask or helmet, the output of said microphone being at least partially directed to said housing transceiver, said microphone located at least closely adjacent to a mouth of the wearer of the mask or helmet; an ear speaker designed to receive signals from said housing transceiver and to generate audible sound from signals received by said housing transceiver; at least one external transceiver located remotely from said housing and designed to be positioned on the wearer at a location remote from the mask or helmet, said external transceiver designed to wirelessly send signals to said housing transceiver, wirelessly receive signals from said housing transceiver, or combinations thereof, said external transceiver connected to a walkie-talkie, embedded into a walkie-talkie, connected to a lapel unit, embedded in a lapel unit, or combinations thereof.

30. The system as defined in claim 29, including first and second external transceivers located on the wearer, said first and second external transceivers designed to wirelessly send signals, wirelessly receive signals, or combinations thereof, between said first and second external transceivers.

31. The system as defined in claim 30, wherein said first external transceiver connected to the walkie-talkie or integrated into the walkie-talkie, said walkie-talkie designed to be positioned at least closely adjacent to a waist region of the wearer, said second external transceiver connected to a lapel unit or embedded in a lapel unit, said lapel unit designed to positioned on the wearer above said walkie-talkie.

32. The system as defined in claim 31, wherein said ear speaker designed to received wireless signals.

33. The system as defined in claim 32, wherein said housing includes an extension member that extends rearwardly and upwardly between said main body portion of said housing and a location at least closely adjacent to an ear of the wearer of the mask or helmet, said ear speaker at least partially located in said extension member such that said ear speaker is at least closely adjacent to an ear of the wearer of the mask or helmet.

34. The system as defined in claim 33, wherein said microphone is a directional microphone for picking up the voice of a wearer of the mask or helmet, said microphone having a sound inlet opening oriented toward the mouth of the wearer of the mask or helmet.

35. The system as defined in claim 31, wherein said housing includes an extension member that extends rearwardly and upwardly between said main body portion of said housing and a location at least closely adjacent to an ear of the wearer of the mask or helmet, said ear speaker at least partially located in said extension member such that said ear speaker is at least closely adjacent to an ear of the wearer of the mask or helmet.

36. The system as defined in claim 35, wherein said ear speaker is electrically connected to said transceiver by at least one wire.

37. The system as defined in claim 36, wherein said extension member including a channel, said channel designed to enable said wire to extend between said ear speaker and said transceiver.

38. The system as defined in claim 37, wherein said microphone is a directional microphone for picking up the voice of a wearer of the mask or helmet, said microphone having a sound inlet opening oriented toward the mouth of the wearer of the mask or helmet.

39. The system as defined in claim 30, wherein said ear speaker designed to received wireless signals.

40. The system as defined in claim 30, wherein said housing includes an extension member that extends rearwardly and upwardly between said main body portion of said housing and a location at least closely adjacent to an ear of the wearer of the mask or helmet, said ear speaker at least partially located in said extension member such that said ear speaker is at least closely adjacent to an ear of the wearer of the mask or helmet.

41. The system as defined in claim 40, wherein said ear speaker is electrically connected to said transceiver by at least one wire.

42. The system as defined in claim 41, wherein said extension member including a channel, said channel designed to enable said wire to extend between said ear speaker and said transceiver.

43. The system as defined in claim 42, wherein said microphone is a directional microphone for picking up the voice of a wearer of the mask or helmet, said microphone having a sound inlet opening oriented toward the mouth of the wearer of the mask or helmet.

44. The system as defined in claim 30, wherein said ear speaker is electrically connected to said transceiver by at least one wire.

45. The system as defined in claim 29, wherein said ear speaker designed to received wireless signals.

46. The system as defined in claim 29, wherein said housing includes an extension member that extends rearwardly and upwardly between said main body portion of said housing and a location at least closely adjacent to an ear of the wearer of the mask or helmet, said ear speaker at least partially located in said extension member such that said ear speaker is at least closely adjacent to an ear of the wearer of the mask or helmet.

47. The system as defined in claim 29, wherein said ear speaker is electrically connected to said transceiver by at least one wire.

48. The system as defined in claim 29, wherein said transceiver and said microphone are at least partially located in a main body portion of said housing, said microphone located adjacent to a voice emitter portion, oxygen inlet or filter inlet of the mask.

49. The system as defined in claim 29, wherein said transceiver is designed to send signals wirelessly to a location remote from the mask or helmet, received signals remote from the mask or helmet, or combinations thereof.

50. The system as defined in claim 29, wherein said signals received by said transceiver, sent by said transceiver, or combinations thereof include radio signals.

51. The system as defined in claim 29, including a voice amplifier connected to said transceiver.

52. The system as defined in claim 29, including a second speaker at least partially located in said housing, said voice amplifier including an amplifier that receives an output from said microphone, said second speaker designed to project sound externally of said housing and the mask or helmet, said second speaker spaced from said ear speaker.

* * * * *